July 31, 1951     O. H. SCHMITT     2,562,682
REMOTE CONTROL SYSTEM
Filed Sept. 18, 1945     2 Sheets-Sheet 1

INVENTOR.
OTTO H. SCHMITT
BY Ralph L. Chappell
ATTORNEY

July 31, 1951 — O. H. SCHMITT — 2,562,682
REMOTE CONTROL SYSTEM
Filed Sept. 18, 1945 — 2 Sheets-Sheet 2

INVENTOR
OTTO H. SCHMITT
BY
ATTORNEY

Patented July 31, 1951

2,562,682

UNITED STATES PATENT OFFICE 2,562,682

REMOTE-CONTROL SYSTEM

Otto H. Schmitt, Port Washington, N. Y., assignor to the United States of America as represented by the Secretary of the Navy Application September 18, 1945, Serial No. 617,133

2 Claims. (Cl. 250—2)

This invention relates to remote control systems. Its object is to produce an improved control system especially adapted for radio control of one or more devices in such a manner as to be immune to natural and willful interference.

According to the invention, a sine wave and one or more harmonics thereof are employed to modulate a carrier, the harmonic or harmonics having had the phase thereof shifted with respect to the fundamental. The received signal has the fundamental and harmonics filtered out into separate channels. The fundamental is separated out into as many channels as there are harmonics and these channels are multiplied respectively to provide a harmonic corresponding to each of the filtered harmonics. In the receiver there are thus provided, for example, a second harmonic and another second harmonic ordinarily out of phase therewith; likewise a third harmonic and another third harmonic ordinarily out of phase therewith. The pairs of corresponding harmonics energize two-phase motors or other energy consuming equipment and the equipment is controlled by adjusting the relative phase of the transmitted harmonics. The system is particularly characterized by its freedom from response to interfering signals.

Accordingly an object of the invention is to provide a remote control system which is immune to natural or willful interference.

Another object of the invention is to provide a remote control system operable by shifting the phase of a part of the transmitted signal.

A further object of the invention is to provide a system for remote control where the transmitted signal is of such nature as to make difficult the unauthorized extraction of intelligence therefrom.

These and other objects will be apparent from the following specification when taken with the accompanying drawings in which.

The specific embodiment here described is for independently controlling two motors by radio.

Figure 1:
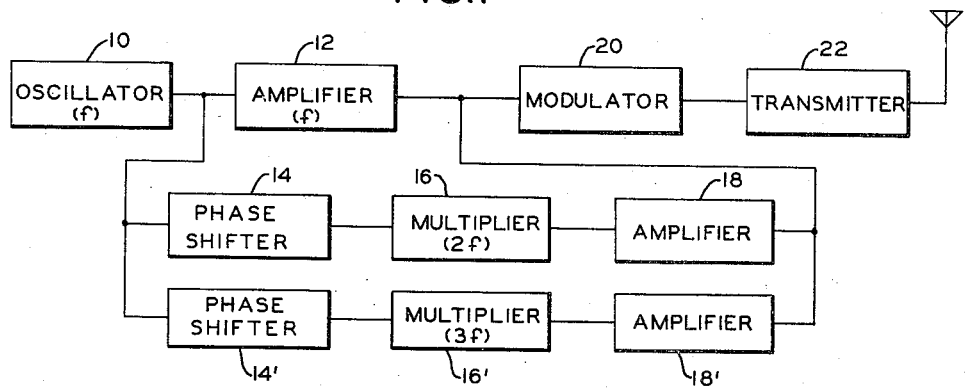
Fig. 1 is the block diagram of a radio transmitter for controlling two two-phase motors.

In Fig. 1, oscillator 10 is of any desired design for yielding a relatively pure sine-wave output in the power-frequency range. It may operate in this embodiment at 150 C. P. S., which is a good compromise for operating two small 400-cycle motors on its second and third harmonics, 300 C. P. S. and 450 C. P. S. The oscillator frequency is directly amplified in unit 12. The output is also fed through phase shifters 14 and 14' and drives multipliers 16 and 16', which in turn drive amplifiers 18 and 18'. Multiplier 16 is here a frequency doubler, and multiplier 16' is a frequency tripler. The output of these three channels is combined and fed to modulator 20 for the transmitter 22. It is desirable though not necessary that the phase shifters precede the amplifiers, for the range of phase control is multiplied with frequency. A phase shift of 90° for the 150-cycle input to the frequency tripler becomes a 270° phase shift for the 450-cycle output.

Figure 2:
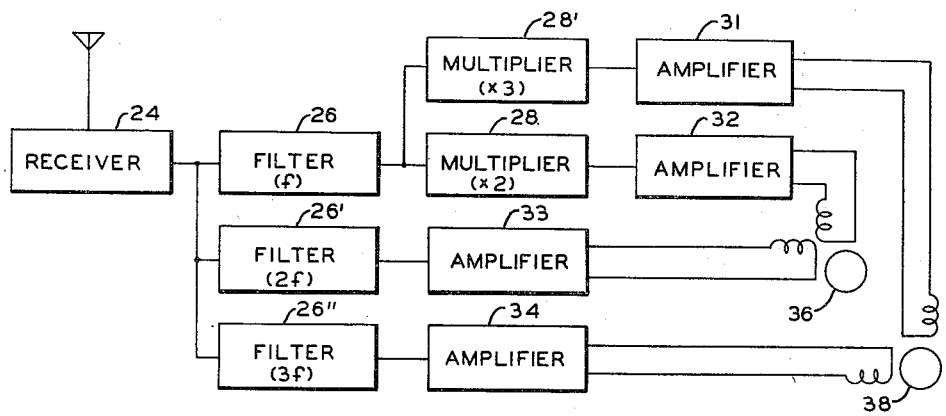
Fig. 2 is the block diagram of a receiver for the system of Fig. 1.

In Fig. 2, receiver 24 is provided with a crystal filter or the like (not shown), so that its acceptance band will be restricted to the narrow control channel transmitted. The likelihood of its being interfered with by an overloading, blocking signal is thus minimized. Desirably, the receiver also includes automatic gain-control circuits. The audio-frequency output of receiver 24 is fed to a high-Q, three section filter 26, 26' and 26'' to divide the combined audio signals into three channels. $f$, $2f$ and $3f$ (150, 300 and 450 C. P. S.). The output of filter section 26 which is peaked at frequency $f$ is fed to two multipliers 28 and 28' to double and triple that frequency. The output of filters 26' and 26'' as well as that from multipliers 28 and 28' are fed to power amplifiers 31, 32, 33 and 34. The output of amplifiers 32 and 33 are fed to the two phases of motor 36, while the output of amplifiers 31 and 34 are appropriately connected to motor 38. It will be understood that for two-phase motors the phase difference of the currents in the two coils should be 90°, for maximum torque.

The phase-shift control is arranged to compensate for phase shifts all through the apparatus. Beyond this, it is used to effect the desired control. A two-phase motor may be used for its torque or rotational output. By appropriate phase shifting, it may be caused to operate in either direction or to remain stationary, as desired. Desirably the signal amplitude applied to the motors is held constant. Devices other than two-phase motors may be controlled, as will be seen. The nature of the control system involved is not easily discovered by those intercepting the signal, for a power-frequency note combined with a fixed percentage of its harmonics sounds the same regardless of the phase angle between the several components.

The power-frequency channels in the transmitter should each be free of component frequencies of the other channels, in order to prevent a limited, undesired effect of each phase shifter on the unrelated motor. The output of multiplier 16 for 2f should be free of the fundamental and of the third harmonic. Likewise, the output of multiplier 16' for 3f should be free of both fundamental and second harmonic. If there were fundamental in either multiplier channel, it would be shifted in phase variably, according to the setting of the phase shifter. When mixed with the output of amplifier 12, the resultant would not be the same in phase as the output of amplifier 12 alone. Operation of either phase shifter would then produce an undesired effect in the phase relation between the resultant, generated-frequency output and the output of that channel which includes the other phase shifter. Similarly, if appreciable third harmonic were included in the output of the frequency doubler, then the phase shifter for the second harmonic channel would affect the phase relation between the output of amplifier 12 and that of amplifier 18'. Each phase shifter should control only the phase of the intended output of its channel.

The second-harmonic output can be made sufficiently pure without filter circuits, using only a pair of tubes operating push-push into a (2f) high-Q tank. The third harmonic output, to be free of second harmonic and fundamental, may require additional filtering, as by means of one or more parallel-T RC networks.

Amplifiers 12, 18 and 18' may not be required for their more obvious purpose of amplification, but they assure the isolation needed to prevent feedback from the multipliers to the oscillator, and they also provide high-impedance output coupling for the high-Q multiplier circuits.

The transmitted signal when received is divided into its three audio components f, 2f and 3f, as by three parallel units of series L—C filters peaked at the respective frequencies and the output taken from the L—C junction and ground. The output of filter 26 is multiplied to 2f and 3f, and the resulting output applied to two motors as shown. The phase relation among the power-frequency components is unaffected by radio transmission, so that phase shift due to varying transmission distance will not vary and will not have to be compensated.

Phase shifters 14 and 14' shift the "phase" of the output of the multipliers relative to that of the amplifier 12 only in a broad sense, for technically the "phase" of a given signal relative to its harmonic has no clear meaning. However, when it is noted that the output signals of amplifiers 18 and 18' are shifted in phase relative to the output of amplifiers 31 and 32, the meaning of the term "phase" will be clear. Phase shifters 14 and 14' compensate for the phase shifts that occur all through the apparatus. Additionally, they change the phase to operate the motors at chosen speeds (or varying degrees of non-rotating torque) in either direction.

The embodiment thus far described relates to two motors. Were the system limited to one motor, the great care in avoiding undesired harmonics in the transmitter power-frequency channels would be largely unnecessary. It is also possible to extend the system beyond two motors. In addition to frequencies f and 2f for operating one motor and f and 3f for a second, the same fundamental frequency f may be used with as many additional harmonics as there are devices to be operated. Alternatively, a second fundamental frequency and its harmonic might be used to modulate the same carrier, as 150, 300 and 450 C. P. S. for two motors, and 120, 240 and 360 C. P. S. for two more. Higher frequency channels may also be used even if they are above the proper range of the motor to be driven, provided that frequency dividers are arranged in the receiver channels. Multiplying the power frequencies transmitted has the effect of broadening the transmission channel required and reducing the permissible selectivity of the receiver. Consequently, the greater the number of devices to be operated, the more easy it becomes to interfere with the reception by the receiver through R-F or I-F overloading.

It has been pointed out that the narrow radio channel required makes possible the use of a receiver which is highly selective and, therefore, one which is not easily blocked by means of a broad-band, high-power interfering transmitter. The system has the further advantage that it is relatively immune to low-power signals attempting with modulation to assume control. Unless the modulation frequency is fairly close to one of the control frequencies, it will be filtered out in units 26, 26' and 26''. Audio "hash" will be utterly ineffective. And since the system is essentially phase responsive, extraneous interfering signals producing a beat with the control signals will be self-canceling. The controlled motor would hunt slowly if the extraneous interfering signal produced a slow beat with a control signal, nevertheless, operating over the period of control in the manner dictated by the control transmitter.

In order to render the system less easily analyzed for reproducing the correct control, spoof audio frequencies might be transmitted, both within and outside the acceptance band of the receiver. But most notable of the system, the two or more control signals may be transmitted constantly. Whether one or more of the motors are running or idle, the modulation sounds the same. The human ear is not responsive to the phase relation between a given note and its harmonics.

Figure 3:
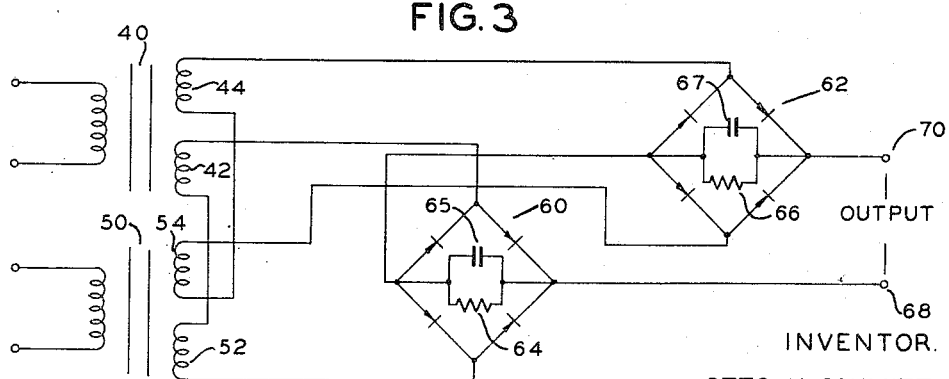
Fig. 3 is a wiring diagram to adapt devices other than two-phase motors to this system.
Figure 4:
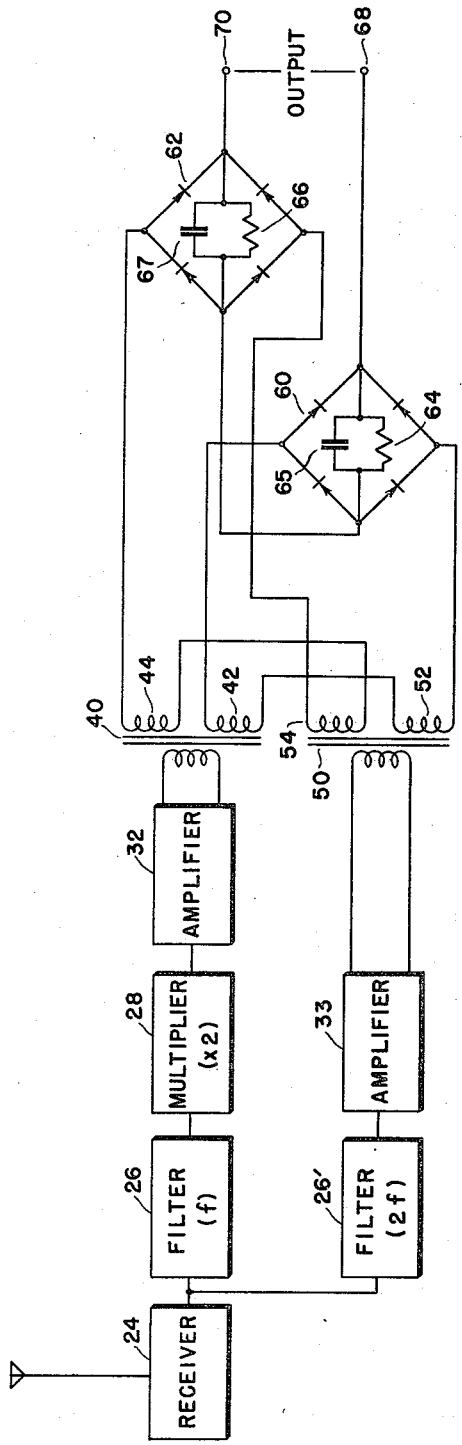
Fig. 4 is a block diagram of the receiver for controlling direct current devices.

The control system described is not limited to control over two-phase motors which are responsive to changes in phase angle. It extends to devices which are variously responsive to voltage variations as will be appreciated from a study of the two-phase converter device of Fig. 3 and the system of Fig. 4. Two identical transformers are illustrated, indicated generally at 40 and 50, and the secondary windings 42, 44, 52 and 54 are also alike. Secondaries 42 and 52 are connected in series to bridge rectifier 60, while secondaries 44 and 54 are connected in series-opposition to bridge rectifier 62. As shown the D. C. bridge circuits are connected in series-opposition. Resistors 64 and 66 shunt the D. C. circuits of the respective bridges. Smoothing condensers 65 and 67 shunting the resistors are desirable.

The transformers 40 and 50 may be supplied from two control channels, as from amplifiers 32 and 33 in Fig. 2. Assuming these output signals are in phase, there will be no output from opposition-connected secondaries 44 and 54, so that bridge 62 will produce no output, while peak output from bridge 60 will result. If the input signals to transformers 40 and 50 are 180° out of phase, bridge 60 will yield zero output while peak output may be obtained from bridge 62. Each bridge yields its output at terminals 68 and 70 through the resistors 64 and 66 and condensers 65 and 67, which shunt the bridges. The polarity of the D. C. output at terminals 68 and 70 will be in one direction or reversed, depending on the phase relation between the input signals to transformers 40 and 50. For a 90° phase angle difference, there will be equal and opposite D. C. voltages developed in the bridges and zero output at terminals 68 and 70.

It is evident that the range of devices that may be operated from remote control under this system, including polarized relays, signal lights, etc., in addition to two-phase motors, is virtually limitless. The system described is peculiarly well suited to radio control, although it may be applied otherwise. When a radio link is involved, the nature of the transmission is not easily detected by an enemy. Furthermore, because high selectivity is permissible, interference by means of the usual high-powered, board-band transmission or crudely simulated modulated carrier will be ineffective.

While the invention has been described as employing one or more harmonics, it will be evident that likewise sub-harmonics may be used in the same manner. Having thus described my invention, what I desire to secure by Letters Patent and claim is:

1. Apparatus for remotely controlling a plurality of two phase induction motors each having first and second field coils comprising, a transmitter for providing a carrier signal, a generator of a primary signal at a basic frequency, a first channel wherein said primary signal is passed unaltered in frequency and in phase, a second channel for variably shifting said primary frequency in phase and doubling the frequency thereof, a third channel for variably shifting said primary signal in phase and tripling the frequency thereof, a modulator for modulating said carrier signal with the outputs of said three channels, a receiver for said modulated carrier signal for providing a composite output, a first filter for detecting said primary signal from said composite output, a second filter for detecting from said composite output said double frequency output of said second channel, a third filter for detecting from said composite output the output of said third channel, a first frequency multiplier for doubling the frequency of a first portion of the output of said first filter, a second frequency multiplier for tripling the frequency of a second portion of the output of said first filter, the output of said second filter being passed unchanged to said first field coil of a first of said two phase induction motors, the output of said third filter being passed unchanged to said first field coil of a second of said two phase induction motors, the output of said first frequency multiplier being applied to said second field coil of said first induction motor and the output of said second frequency multiplier being applied to said second field coil of said second induction motor, whereby the rotation of said induction motors is controllable by the variation in phase shift in said second and said third channels.

2. Apparatus for remotely controlling a plurality of direct current devices, a transmitter for providing a carrier signal, a generator of a primary signal at a basic frequency, a first channel wherein said primary signal is passed unaltered in frequency and in phase, a second channel for variably shifting said primary frequency in phase and doubling the frequency thereof, a modulator for modulating said carrier signal with the outputs of said two channels, a receiver of modulated carrier signal for providing a composite output, a first filter for detecting said primary signal from said composite output, a second filter for detecting from said composite output said double frequency output of said second channel, a frequency multiplier for doubling the frequency of a first portion of the output of said first filter, two similar transformers, each having a primary coil and first and second secondary coils, and two bridge rectifiers, the output of said second filter being passed unchanged and applied to the primary coil of said first transformer, the output of said frequency multiplier being connected to the primary coil of said second transformer, the first secondary coil of said first transformer and the first secondary coil of said second transformer being connected in series with the first of said bridge rectifiers, the second secondary coil of said first transformer and the second secondary coil of said second transformer being connected in series opposition with the second of said bridge rectifiers, and direct-current shunt resistors connected across each of said bridge rectifiers, whereby voltages variable with variation in phase shift in said second channel are provided.

OTTO H. SCHMITT.

REFERENCES CITED

The following references are of record in the file of this patent:

UNITED STATES PATENTS

| Number | Name | Date |
|---|---|---|
| 1,941,615 | Mirick | Jan. 2, 1934 |
| 2,236,374 | Marrison | Mar. 25, 1941 |
| 2,256,487 | Moseley et al. | Sept. 23, 1941 |
| 2,363,941 | Busignies | Nov. 28, 1944 |
| 2,402,973 | Moore, Jr. | July 2, 1946 |
| 2,433,195 | Bond | Dec. 23, 1947 |